(12) United States Patent
Manmohan

(10) Patent No.: US 8,595,192 B1
(45) Date of Patent: Nov. 26, 2013

(54) SYSTEMS AND METHODS FOR PROVIDING HIGH AVAILABILITY TO INSTANCE-BOUND DATABASES

(75) Inventor: Sarin Sumit Manmohan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 169 days.

(21) Appl. No.: 12/957,581

(22) Filed: Dec. 1, 2010

(51) Int. Cl.
*G06F 17/00* (2006.01)
*G06F 7/00* (2006.01)

(52) U.S. Cl.
USPC .......................... 707/678; 718/101; 707/809

(58) Field of Classification Search
USPC .................................. 707/809, 678; 718/101
See application file for complete search history.

(56) References Cited

U.S. PATENT DOCUMENTS

| | | | | |
|---|---|---|---|---|
| 6,782,400 B2 * | 8/2004 | Geuss et al. | .................. | 707/694 |
| 6,795,830 B1 * | 9/2004 | Banerjee et al. | ....... | 707/999.002 |
| 6,970,939 B2 * | 11/2005 | Sim | .............................. | 709/236 |
| 7,293,040 B2 * | 11/2007 | Terada | ................... | 707/999.102 |
| 7,441,033 B2 * | 10/2008 | Chidambaran et al. | ....... | 709/226 |
| 7,552,218 B2 * | 6/2009 | Kaluskar et al. | ............... | 709/227 |
| 7,680,771 B2 * | 3/2010 | Cialini et al. | .......... | 707/999.003 |
| 7,856,461 B2 * | 12/2010 | Venkatesan et al. | .......... | 707/953 |
| 7,921,179 B1 * | 4/2011 | Zheng et al. | ................... | 709/213 |
| 7,933,882 B2 * | 4/2011 | Wilding et al. | ............... | 707/704 |
| 8,069,148 B2 * | 11/2011 | Richins et al. | ................ | 707/648 |
| 8,156,271 B2 * | 4/2012 | Reece | ............................ | 710/74 |
| 2005/0010919 A1 * | 1/2005 | Ramanathan et al. | ........ | 717/174 |
| 2006/0136448 A1 * | 6/2006 | Cialini et al. | ................. | 707/101 |
| 2006/0288048 A1 * | 12/2006 | Kamohara et al. | ............ | 707/200 |
| 2008/0288554 A1 * | 11/2008 | Wilding et al. | ............... | 707/200 |
| 2009/0282083 A1 * | 11/2009 | Richins et al. | ................ | 707/200 |

OTHER PUBLICATIONS

Kubo et al. "Backing up Microsoft SQL Server with IBM Tivoli Storage Manager", Published on Jun. 27, 2008, IBM Redbooks, p. 265.*

* cited by examiner

*Primary Examiner* — Pavan Mamillapalli
(74) *Attorney, Agent, or Firm* — ALG Intellectual Property, LLC

(57) ABSTRACT

A computer-implemented method for providing high availability to instance-bound databases may include (1) identifying a first instance of a database server, the first instance hosting a plurality of databases, (2) identifying a second instance of the database server, (3) identifying at least one user database within the plurality of databases to fail over, and (4) migrating the user database to the second instance without migrating every database in the plurality of databases to the second instance. Various other methods, systems, and computer-readable media are also disclosed.

17 Claims, 7 Drawing Sheets

SYSTEMS AND METHODS FOR PROVIDING HIGH AVAILABILITY TO INSTANCE-BOUND DATABASES

BACKGROUND

Organizations increasingly depend on digitally stored data in the course of business. Because of this, administrators managing databases containing critical data in large-scale environments may face increasing demands to improve business continuity by providing high availability to such databases.

In order to maximize database availability, an administrator may migrate databases operating under one instance of a database server to another instance, whether to work around a planned downtime for a computing resource, as part of a planned migration during system reorganization, or in response to an unexpected disaster. By migrating databases in this manner, the databases may be kept available even if a computing resource previously hosting one of the databases is no longer available. Unfortunately, traditional migration technologies may create a significant availability gap during database migration. Traditional migration technologies may also create an availability gap for all databases operating under an instance, even if only one of the databases required migration. Accordingly, the instant disclosure identifies a need for additional and improved systems and methods for providing high availability to instance-bound databases.

SUMMARY

As will be described in greater detail below, the instant disclosure generally relates to systems and methods for providing high availability to instance-bound databases by migrating user databases from one instance to another on an individual basis and/or by service group. In one example, an exemplary method for accomplishing such a task may include (1) identifying a first instance of a database server, the first instance hosting a plurality of databases, (2) identifying a second instance of the database server, (3) identifying at least one user database within the plurality of databases to fail over, and then (4) migrating the user database to the second instance without migrating every database in the plurality of databases to the second instance.

The first and second instances may operate within a variety of contexts. For example, the first instance may be located on a first computing system and the second instance may be located on a second computing system. In some examples, the first computing system may include a first node in a cluster of nodes and the second computing system may include a second node in the cluster of nodes.

The systems described herein may identify the user database to fail over in a variety of contexts. For example, identifying the user database may entail identifying an operator-initiated request to migrate the user database. Additionally or alternatively, identifying the user database may entail identifying a failure of a resource used by the user database. In some examples, these systems may identify a service group that includes the user database along with and/or as a part of identifying the user database. The user database may be stored on a shared storage system (e.g., with other user databases within the same service group). Additionally, at least one system database within the plurality of databases may be stored on a local storage system of the first instance.

Migrating the user database to the second instance may include a variety of steps. In some examples, migrating the user database may include migrating each database within the service group of the user database. Migrating the user database also may include binding a virtual network address corresponding to the user database to the second instance. Binding the virtual network address may include (1) determining that the second instance is running, (2) quiescing the second instance before binding the virtual network address to the second instance, and then (3) resuming the second instance after binding the virtual network address to the second instance.

Migrating the user database may also include creating a second alias for the second instance to correspond to a name of the first instance. Creating the alias may include (1) determining that the second instance is running, (2) quiescing the second instance before creating the alias for the second instance, and then (3) resuming the second instance after creating the alias for the second instance. Migrating the user database may also include attaching the user database to the second instance. In some examples, migrating the user database may also include updating a system database on the second instance with information relating to the user database.

By migrating user databases from one instance to another individually or by service group instance instead of migrating all databases from one instance to another instance, the systems and methods described herein may decrease downtime for the databases as well as eliminate downtime for user databases that do not need migration but would otherwise be migrated.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
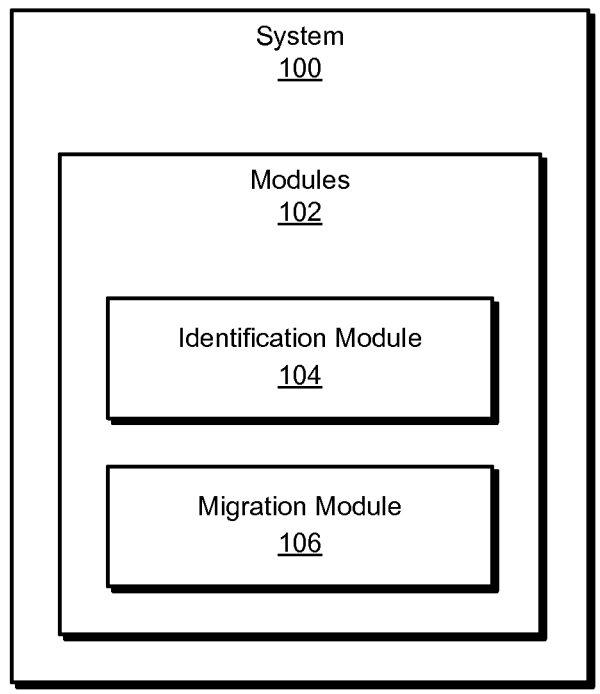
FIG. 1 is a block diagram of an exemplary system for providing high availability to instance-bound databases.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
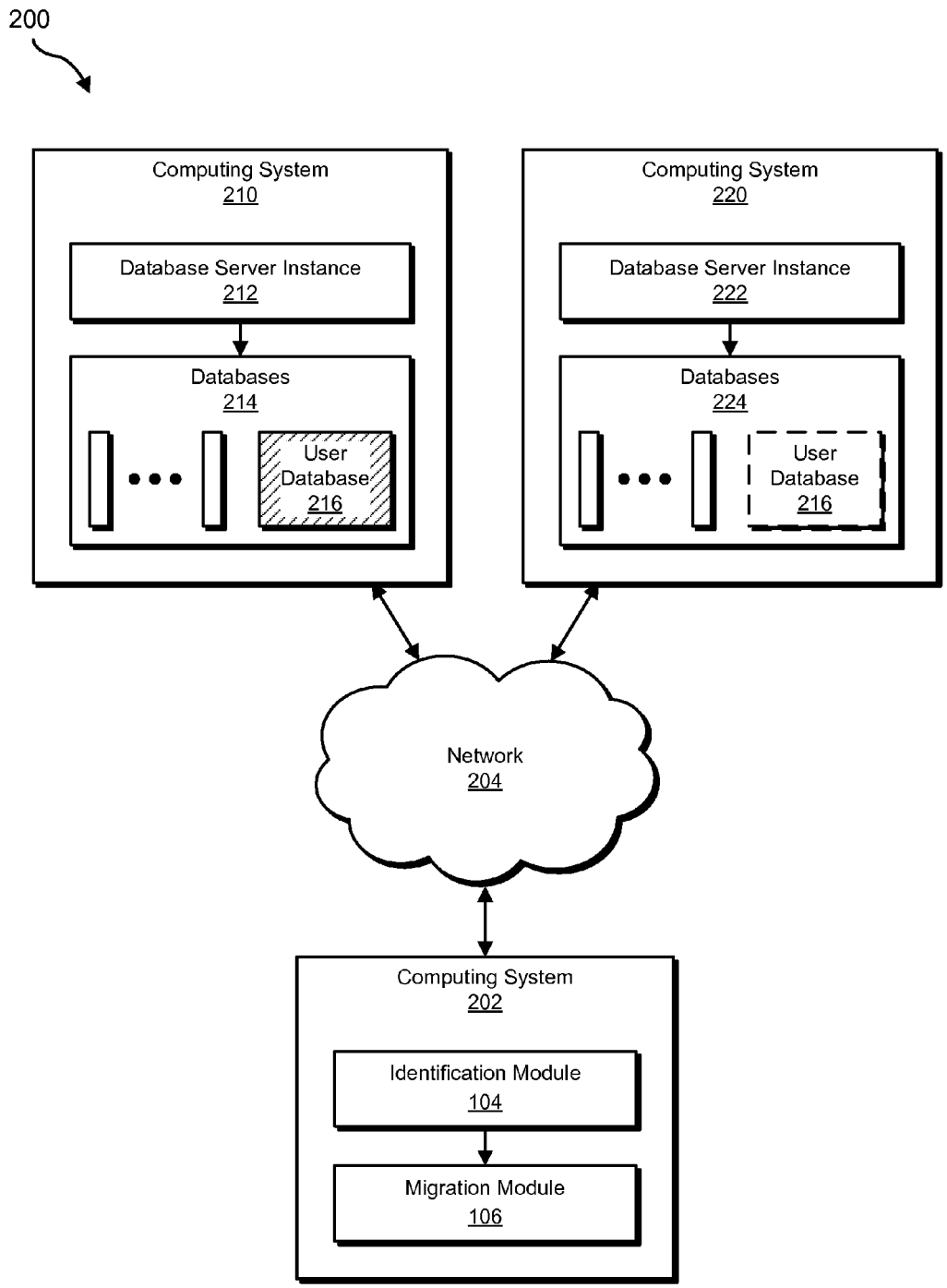
FIG. 2 is a block diagram of an exemplary system for providing high availability to instance-bound databases.

The following will provide, with reference to FIGS. 1-2, detailed descriptions of exemplary systems for providing high availability to instance-bound databases. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for providing high availability to instance-bound databases. As illustrated in this figure, exemplary system 100 may include one or more modules 102 for performing one or more tasks. For example, and as will be explained in greater detail below, exemplary system 100 may include an identification module 104 programmed to (1) identify a first instance of a database server, the first instance hosting a plurality of databases, (2) identify a second instance of the database server, and (3) identify at least one user database within the plurality of databases to fail over.

In addition, and as will be described in greater detail below, exemplary system 100 may include a migration module 106 programmed to migrate the user database to the second instance without migrating every database in the plurality of databases to the second instance. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 202, computing system 210, and/or computing system 220), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 in communication with a computing system 210 and a computing system 220 via a network 204.

In one embodiment, and as will be described in greater detail below, modules 102 from FIG. 1 may program computing system 202 to migrate one or more databases from a database server instance 212 to a database server instance 222 by (1) identifying a first instance of a database server (e.g., database server instance 212 running on computing system 210), the first instance hosting a plurality of databases (e.g., databases 214), (2) identifying a second instance of the database server (e.g., database server instance 222 running on computing system 220), (3) identifying at least one user database within the plurality of databases to fail over (e.g., a user database 216), and then (4) migrating the user database to the second instance without migrating every database in the plurality of databases to the second instance (e.g., migrating user database 216 to database server instance 222 without migrating all of databases 214).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Computing systems 210 and 220 generally represent any type or form of computing device that is capable of running an instance of a database server. Examples of computing systems 210 and 220 include, without limitation, database server machines configured to provide various database services and/or nodes of a cluster.

As illustrated in FIG. 2, computing systems 210 and 220 may include databases 214 and 224, respectively. Databases 214 and 224 may represent portions of one or more computing devices. For example, databases 214 and 224 may represent a portion of computing system 610 in FIG. 6 and/or portions of exemplary network architecture 700 in FIG. 7. Alternatively, databases 214 and 224 in FIG. 2 may represent one or more physically separate devices capable of being accessed by a computing device, such as computing system 610 in FIG. 6 and/or portions of exemplary network architecture 700 in FIG. 7. In some examples, databases 214 and 224 may represent portions of shared storage systems.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing system 202, computing system 210, and computing system 220.

Figure 3:
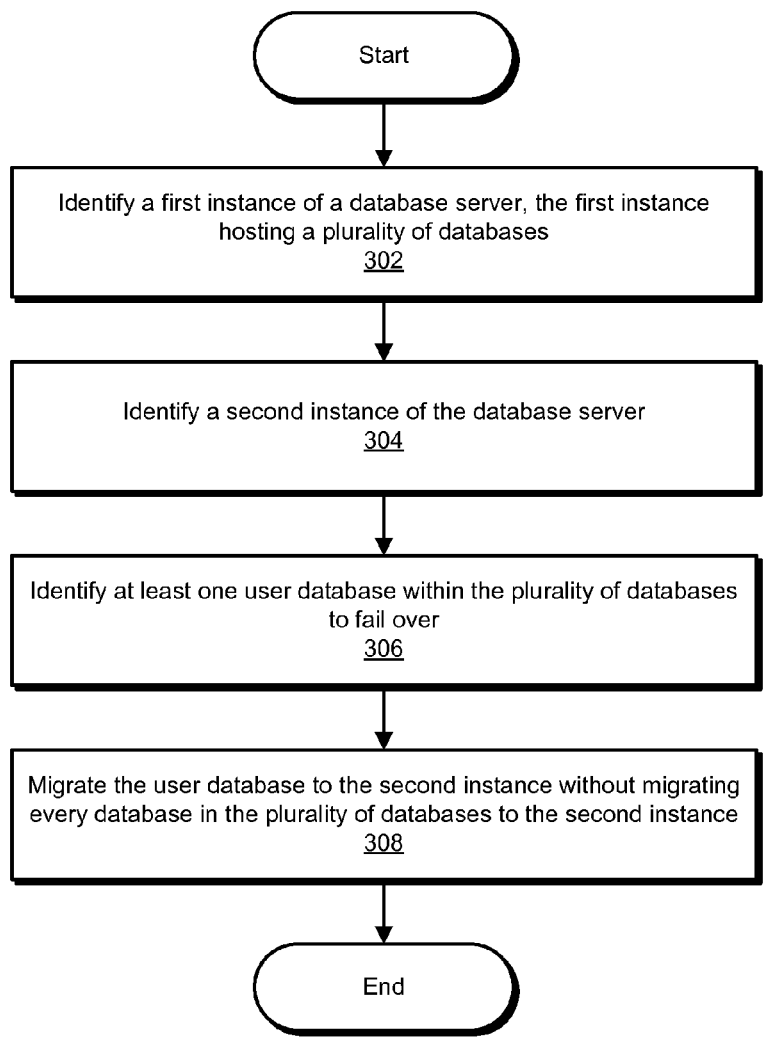
FIG. 3 is a flow diagram of an exemplary method for providing high availability to instance-bound databases.

FIG. 3 is a flow diagram of an exemplary computer-implemented method 300 for providing high availability to instance-bound databases. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a first instance of a database server, where the first instance hosts a plurality of databases. For example, at step 302 identification module 104 may, as part of computing system 202, identify database server instance 212.

As used herein, the phrase "database server" may refer to any system, such as a computer program and/or group of computer programs, configured to provide database services to one or more other computing systems. Examples of a database server include, without limitation, MICROSOFT SQL SERVER and MYSQL SERVER. Accordingly, the term "instance," as applied to a database server, may refer to any instance, executable copy, running process, independent portion, and/or agent of the database server. In some examples, instances of the database server may collectively provide database services at separately addressable locations within the database server (e.g., an instance may be addressed with an IP address and a name of the instance). As will be described in greater detail below, an instance may host one or more user databases containing primary data as well as one or more system databases containing data relating to the management of the instance (including metadata relating to the user databases).

Identification module 104 may identify the first instance in any suitable manner. For example, identification module 104 may identify the first instance by identifying a request to fail a database over from the first instance.

Figure 4:
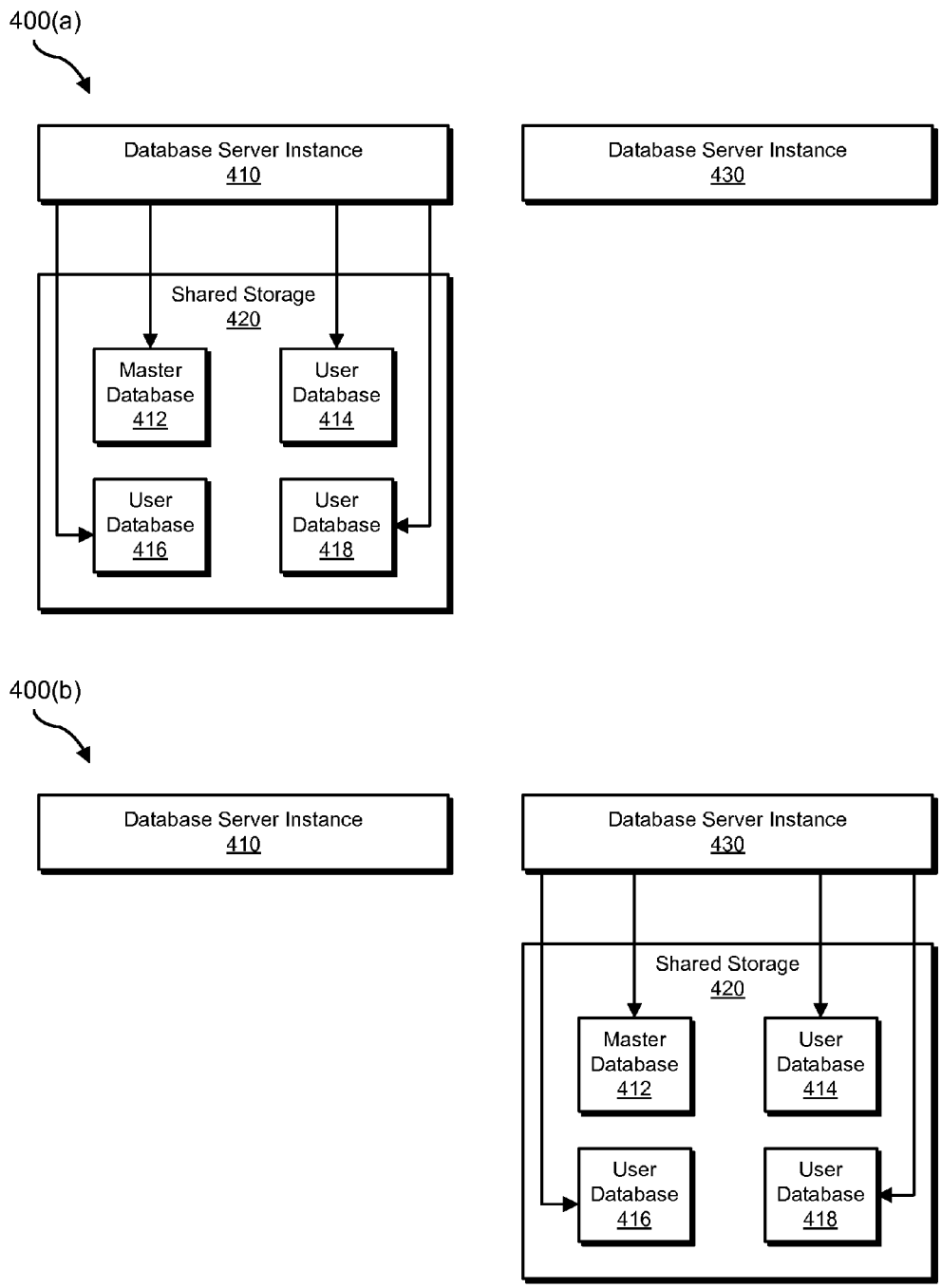
FIG. 4 is a block diagram of an exemplary traditional system for migrating instance-bound databases.
Figure 5:
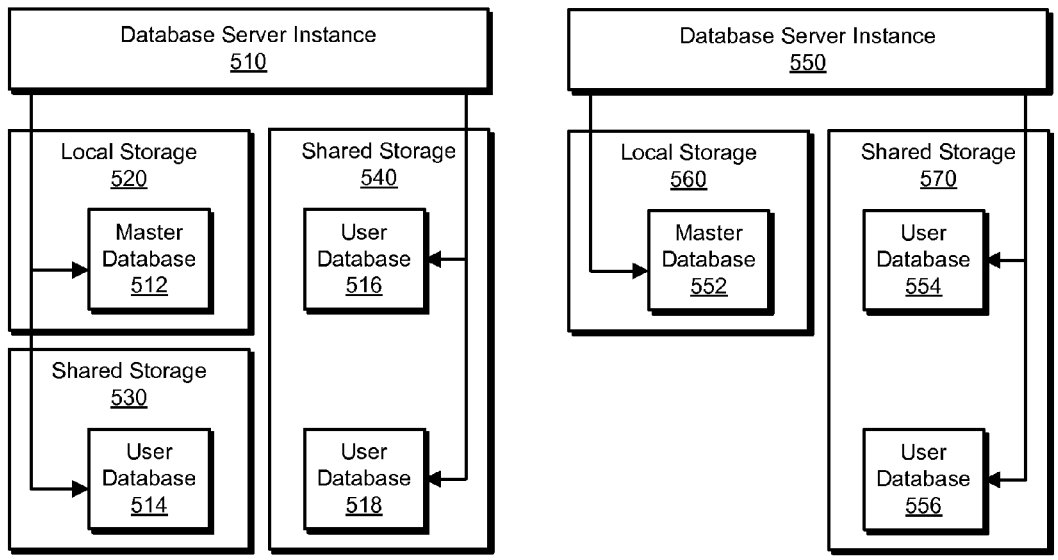
FIG. 5 is a block diagram of an exemplary system for providing high availability to instance-bound databases.
Figure 5:
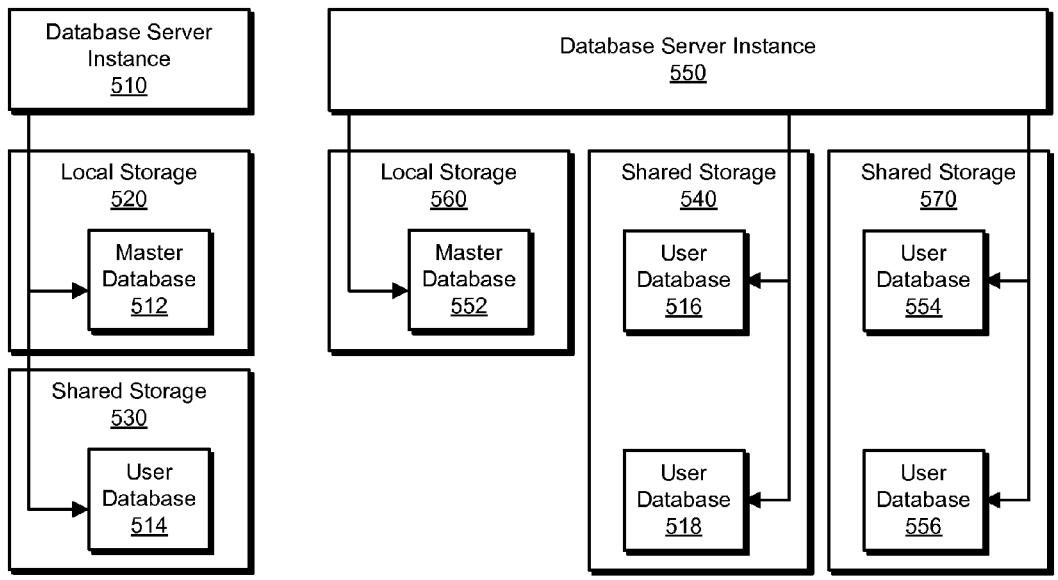

FIG. 4 illustrates an exemplary traditional system for migrating instance-bound databases in a state 400(a) before migrating the databases of a database server instance 410 to a database server instance 430 and a state 400(b) after the migration. In contrast, FIG. 5 illustrates an exemplary system according to the instant disclosure for providing high availability to instance-bound databases in a state 500(a) before migrating user databases 516 and 518 from a database server instance 510 to a database server instance 550 and a state 500(b) after the migration. Using FIG. 5 as an example for step 302, identification module 104 may identify database server instance 510 hosting a master database 512 and user databases 514, 516, and 518.

Returning to FIG. 3, at step 304 one or more of the systems described herein may identify a second instance of the database server. For example, at step 304 identification module 104 may, as part of computing system 202, identify database server instance 222. Using FIG. 5 as an example, at step 304 identification module 104 may identify database server instance 550.

In some examples, the second instance may be located on a different computing system than the first instance. For example, the first instance may be located on a first computing system and the second instance may be located on a second computing system. The database server may also run on a cluster of nodes. For example, the first computing system may include a first node in the cluster of nodes and the second computing system may include a second node in the cluster of nodes. Additionally or alternatively, the first computing system may include a first virtual machine and the second computing system may include a second virtual machine.

In some examples, identification module 104 may identify the second instance by identifying an instance on the second computing system with the same name as the first instance. As will be explained in greater detail below, this may allow the clients to access a migrated database at the same apparent location. Additionally or alternatively, identification module 104 may identify the second instance by identifying an instance on the second computing system with a different name (e.g., a default instance name).

Returning to FIG. 3, at step 306 one or more of the systems described herein may identify at least one user database within the plurality of databases to fail over. For example, at step 306 identification module 104 may, as part of computing system 202, identify user database 216. Using FIG. 5 as an example, at step 306 identification module 104 may identify user databases 516 and 518.

As used herein, the phrase "system database" may refer to any database used for the internal management of a database instance and/or database server hosting the database. Examples of system databases may include master databases, resource databases, temporary databases, etc. As used herein, the phrase "user database" may refer to any non-system database and/or any database created and/or used for storing and/or providing data for one or more clients.

Identification module 104 may identify the user database in a variety of ways. For example, identification module 104 may receive a request to fail over the user database. Additionally or alternatively, identification module 104 may identify a failure of the user database and/or a failure of a resource used by the user database and/or used for access to the user database. In some examples, identification module 104 may identify the user database by identifying a service group requiring a failover that includes the user database. Additionally or alternatively, when identification module 104 identifies the user database to fail over, identification module 104 may identify a service group to which the user database belongs and/or other user databases within the service group (e.g., in order to migrate all user databases within the service group together). As used herein, the phrase "service group" may refer to a set of resources that work together to provide database services to one or more clients. For example, a service group may include one or more user databases, a shared storage system, and/or an IP address.

Using FIG. 5 as an example, identification module 104 may identify a service group including shared storage 540 to fail over and, accordingly, identify user databases 516 and 518 to fail over. Additionally or alternatively, identification module 104 may identify user database 516 to fail over and, accordingly, identify all other user databases within the same service group as database 516 (e.g., database 518) to fail over.

In some examples, the user database may be stored on a shared storage system (e.g., within the same service group as the user database) accessible by the first instance. Additionally, at least one system database within the plurality of databases may be stored on a local storage system of the first instance. As used herein, the phrase "local storage system" may refer to any storage system associated with a single computing device. For example, a local storage system may include a direct-attached storage device and/or any other dedicated storage device.

Using FIG. 5 as an example, user database 514 may be stored on a shared storage 530 and user databases 516 and 518 may be stored on a shared storage 540. In some examples, shared storage 530 and 540 and their respective databases may be members of separate service groups. For example, user database 514 may be accessible by an IP address in its service group and user databases 516 and 518 may be accessible by a separate IP address. Additionally, master database 512 may be stored on a local storage 520. Local storage 520 may be a storage device that is local to a computing system that runs database server instance 510.

Returning to step 306, identification module 104 may identify the user database in a variety of contexts. For example, identification module 104 may identify an operator-initiated request to migrate the user database. For example, an administrator may request to migrate the user database as part of a planned shutdown of the first instance and/or a resource available to the first instance, as part of a reorganization and/or rebalancing of a cluster on which the database server operates, etc. In some examples, identification module 104 may identify an automated request to migrate the user database (e.g., from a daemon configured to automatically manage database server instances). Additionally or alternatively, as described earlier, identification module 104 may identify the user database due to the failure of a resource used by the user database. For example, an agent monitoring the health of the user database, the storage used by the user database, and/or an IP address used by the user database may detect a failure of one of these resources.

Returning to FIG. 3, at step 308 one or more of the systems described herein may migrate the user database to the second instance without migrating every database in the plurality of databases to the second instance. For example, at step 308 migration module 106 may, as part of computing system 202, migrate user database 216 to database server instance 222 without migrating all of databases 214 to database server instance 222. Using FIG. 5 as an example, at step 308 migration module 106 may migrate user databases 516 and 518 to database server instance 550 without migrating master database 512 or user database 514 to the second instance.

As mentioned earlier, in some examples identification module 104 may identify the service group of the user database for failing over. In these examples, migration module 106 may migrate each database within the service group.

Migration module 106 may migrate the user database with a variety of steps. For example, migration module 106 may bind a virtual network address corresponding to the user database to the second instance. For example, the virtual network address may be a virtual network address by which the user database could be accessed at the first instance. In some examples, the virtual network address may be a member of a service group to which the user database belongs. In some examples, the second instance may be running when migration module 106 is to bind the virtual network address. In these examples, migration module 106 may (1) determine that the second instance is running, (2) quiesce the second instance before binding the virtual network address to the second instance, and (3) resume the second instance after binding the virtual network address to the second instance. As used herein, the term "quiescing" as applied to an instance may refer to any act of pausing, quiescing, and/or suspending at least a portion of the instance. In some examples, quiescing an instance may ensure that any transactions with the instance are correct and consistent (e.g., by completing unfinished transactions and/or by preventing new transactions while the instance is reconfigured).

In some examples, migration module 106 may create an alias for the second instance to correspond to the name of the first instance. For example, the name of the first instance may be a name by which the user database could be located at the first instance. In some examples, the second instance may be running when migration module 106 is to apply the alias to second instance. In these examples, migration module 106 may (1) determine that the second instance is running, (2) quiesce the second instance before creating the alias for the second instance, and (3) resume the second instance after creating the alias. As mentioned earlier, in some examples, identification module 104 may have selected the second instance because the second instance had the same name as the first instance. In these examples, migration module 106 may not need to create an alias for the second instance.

By binding the virtual network address to the second instance and/or creating the alias for the second instance, migration module 106 may allow the user database to be accessed at the same apparent location as before the migration from a client perspective. For example, if the name of the first instance is "finance" and the IP address of the service group including the user database is "35.134.53.253," while the name of the second instance is "marketing" and the only IP address bound to the second instance is "35.134.53.230," migration module 106 may allow clients to continue to access the user database at "finance/35.134.53.253" after migrating the user database to the second instance.

In some examples, migration module 106 may attach the user database to the second instance. If the second instance is not running, migration module 106 may first start the second instance. Migration module 106 may also update a system database on the second instance with information relating to the user database. For example, migration module 106 may update the system database with security permissions for accessing the user database. After step 308, method 300 may terminate.

As illustrated in FIG. 4, traditional technologies may involve migrating all databases hosted by an instance (including system databases). For example, traditional technologies may have migrated a master database 412 and user databases 414, 416, 418 to database server instance 430 as a group. These traditional technologies may accordingly provide less flexibility as well as more downtime for more databases. As illustrated in FIG. 5, the systems and methods described herein may allow for more flexibility and quicker migration while affecting fewer databases. For example, these systems and methods may migrate user databases 516 and 518 to database server instance 550 without involving or disrupting master database 512 and user database 514.

As detailed above, by migrating user databases from one instance to another individually or by service group instance instead of migrating all databases from one instance to another instance, the systems and methods described herein may decrease downtime for the databases as well as eliminate downtime for user databases that do not need migration but would otherwise be migrated.

Figure 6:
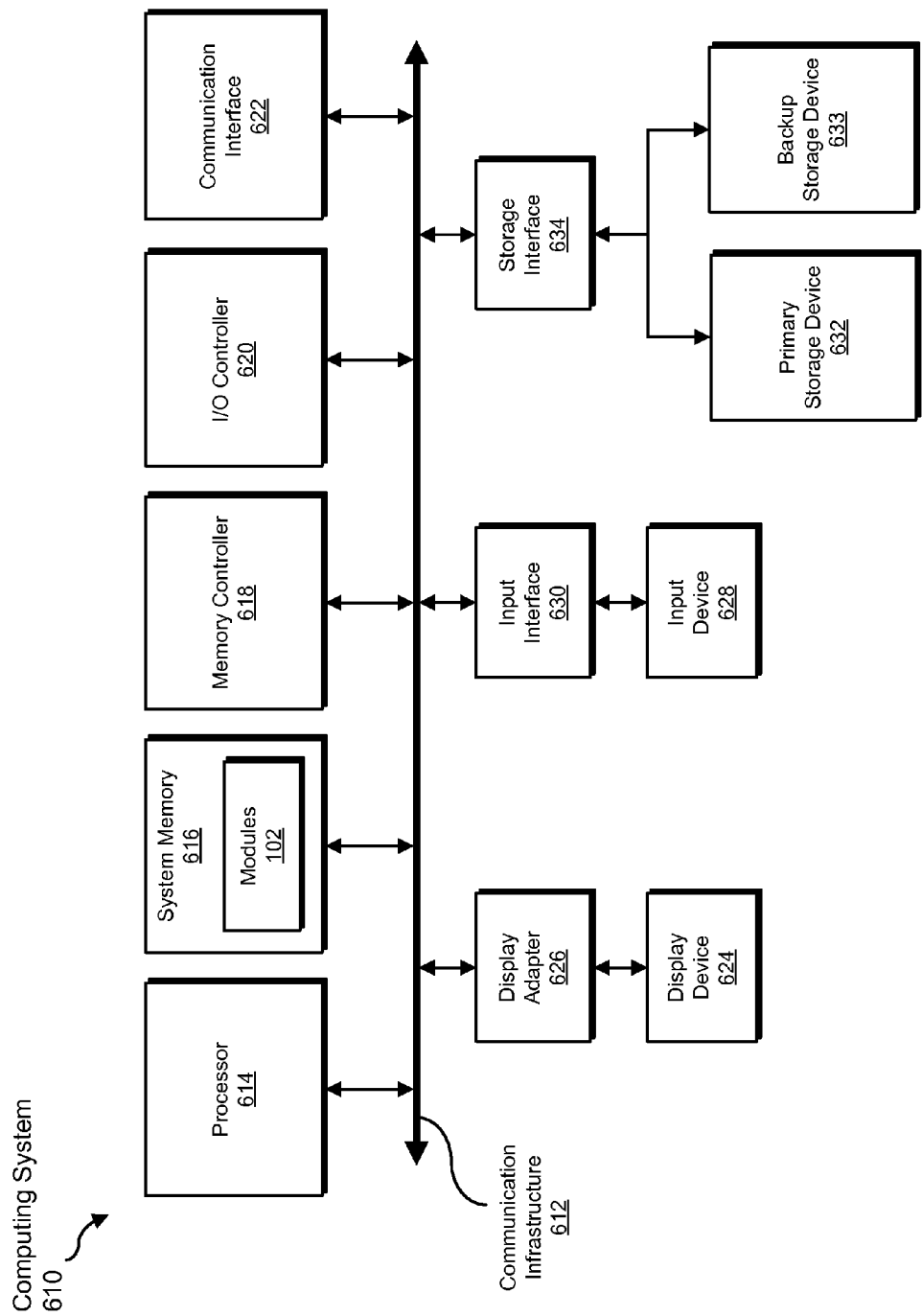
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, migrating, binding, determining, quiescing, resuming, creating, attaching, and/or updating steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, migrating, binding, determining, quiescing, resuming, creating, attaching, and/or updating.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, migrating, binding, determining, quiescing, resuming, creating, attaching, and/or updating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, migrating, binding, determining, quiescing, resuming, creating, attaching, and/or updating steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, migrating, binding, determining, quiescing, resuming, creating, attaching, and/or updating steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, migrating, binding, determining, quiescing, resuming, creating, attaching, and/or updating steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
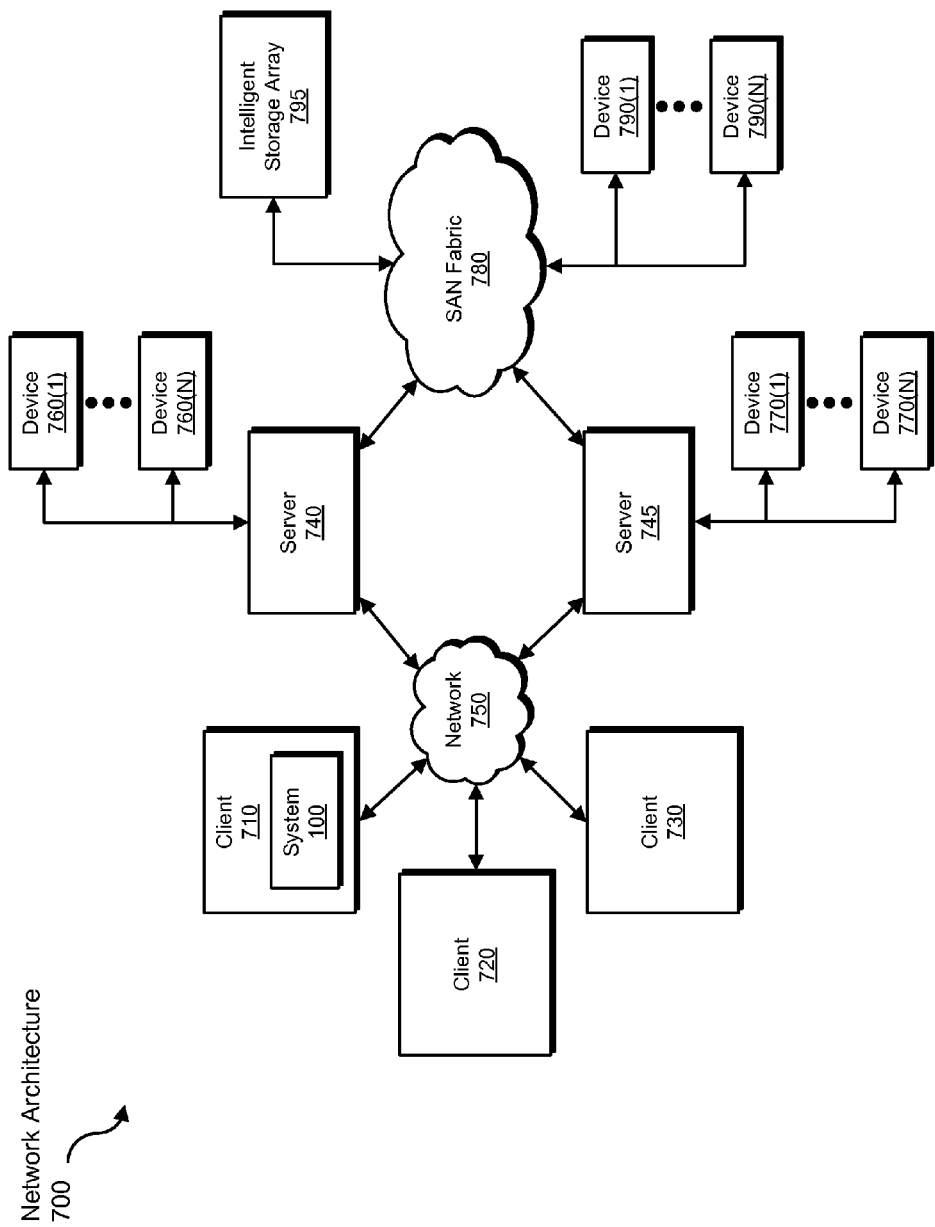
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760 (1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, migrating, binding, determining, quiescing, resuming, creating, attaching, and/or updating steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for providing high availability to instance-bound databases.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a database server into a more flexible, efficient, and high-availability database server.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing high availability to instance-bound databases, at least a portion of the method being performed by a computing device comprising at least one processor, the method comprising:
   configuring a first instance of a database server to host a plurality of databases by:
      storing at least one system database within the plurality of databases on a local storage system of the first instance, wherein the system database contains data necessary to manage the first instance;
      storing at least one user database within the plurality of databases on a shared storage system that is accessible by the first instance;
   identifying a second instance of the database server;
   identifying a need to fail over the user database from the first instance to the second instance;
   migrating the user database from the first instance to the second instance without migrating every database in the plurality of databases from the first instance to the second instance at least in part by binding a virtual network address corresponding to the user database to the second instance.

2. The computer-implemented method of claim 1, wherein the first instance is located on a first computing system and the second instance is located on a second computing system.

3. The computer-implemented method of claim 2, wherein the first computing system comprises a first node in a cluster of nodes and the second computing system comprises a second node in the cluster of nodes.

4. The computer-implemented method of claim 1, further comprising identifying a service group that includes the user database.

5. The computer-implemented method of claim 4, wherein migrating the user database comprises migrating each database within the service group.

6. The computer-implemented method of claim 1, wherein binding the virtual network address to the second instance comprises:
   determining that the second instance is running;
   quiescing the second instance before binding the virtual network address to the second instance;
   resuming the second instance after binding the virtual network address to the second instance.

7. The computer-implemented method of claim 1, wherein migrating the user database from the first instance to the second instance comprises creating an alias for the second instance to correspond to a name of the first instance.

8. The computer-implemented method of claim 7, wherein creating the alias for the second instance comprises:
   determining that the second instance is running;
   quiescing the second instance before creating the alias for the second instance;
   resuming the second instance after creating the alias for the second instance.

9. The computer-implemented method of claim 1, wherein migrating the user database from the first instance to the second instance comprises attaching the user database to the second instance.

10. The computer-implemented method of claim 1, wherein identifying the need to fail over the user database comprises at least one of:
   identifying an operator-initiated request to migrate the user database;
   identifying a failure of a resource used by the user database.

11. The computer-implemented method of claim 1, wherein migrating the user database from the first instance to the second instance comprises updating a system database on the second instance with information relating to the user database.

12. A system for providing high availability to instance-bound databases, the system comprising:
   an identification module programmed to:
      configure a first instance of a database server to host a plurality of databases by:
         storing at least one system database within the plurality of databases on a local storage system of the first instance, wherein the system database contains data necessary to manage the first instance;

storing at least one user database within the plurality of databases on a shared storage system that is accessible by the first instance;

identify a second instance of the database server;

identify a need to fail over the user database from the first instance to the second instance;

a migration module programmed to migrate the user database from the first instance to the second instance without migrating every database in the plurality of databases from the first instance to the second instance at least in part by binding a virtual network address corresponding to the user database to the second instance;

at least one hardware processor configured to execute the identification module and the migration module.

13. The system of claim 12, wherein the first instance is located on a first computing system and the second instance is located on a second computing system.

14. The system of claim 13, wherein the first computing system comprises a first node in a cluster of nodes and the second computing system comprises a second node in the cluster of nodes.

15. The system of claim 12, wherein the identification module is further programmed to identify a service group that includes the user database.

16. The system of claim 15, wherein the migration module is programmed to migrate the user database by migrating each database within the service group.

17. A non-transitory computer-readable-storage medium comprising one or more computer-executable instructions that, when executed by at least one processor of a computing device, cause the computing device to:

configure a first instance of a database server to host a plurality of databases by:

storing at least one system database within the plurality of databases on a local storage system of the first instance, wherein the system database contains data necessary to manage the first instance;

storing at least one user database within the plurality of databases on a shared storage system that is accessible by the first instance;

identify a second instance of the database server;

identify a need to fail over the user database from the first instance to the second instance;

migrate the user database from the first instance to the second instance without migrating every database in the plurality of databases from the first instance to the second instance at least in part by binding a virtual network address corresponding to the user database to the second instance.

* * * * *